United States Patent
Braunschädel

[11] Patent Number: 6,056,318
[45] Date of Patent: May 2, 2000

[54] IMPACT PROTECTION DEVICE FOR VEHICLE OCCUPANTS WITH AN INFLATABLE GAS BAG

[75] Inventor: Axel Braunschädel, Goldbach, Germany

[73] Assignee: TRW Automotive Safety Systems GmbH, Aschaffenburg, Germany

[21] Appl. No.: 09/193,154

[22] Filed: Nov. 17, 1998

[30] Foreign Application Priority Data

Nov. 19, 1997 [DE] Germany .................. 297 20 462 U

[51] Int. Cl.[7] .................................................. B60R 21/30
[52] U.S. Cl. .................................. 280/739; 280/743.1
[58] Field of Search ............................ 280/743.1, 738, 280/739

[56] References Cited

U.S. PATENT DOCUMENTS

| | | | |
|---|---|---|---|
| 3,820,814 | 6/1974 | Allgaier et al. | |
| 4,111,458 | 9/1978 | Okada et al. | 280/739 |
| 5,496,063 | 3/1996 | Conlee et al. | 280/739 |
| 5,664,805 | 9/1997 | Yoshida et al. | 280/743.1 |
| 5,839,755 | 11/1998 | Turnbull | 280/743.1 |

FOREIGN PATENT DOCUMENTS

| | | | |
|---|---|---|---|
| 2116347 | 10/1972 | Germany . | |
| 19630855 | 7/1997 | Germany . | |
| 4-2543 | 1/1992 | Japan | 280/739 |
| 08244555 | 9/1996 | Japan . | |
| 08268214 | 10/1996 | Japan . | |

*Primary Examiner*—Eric Culbreth
*Attorney, Agent, or Firm*—Tarolli, Sundheim, Covell, Tummino & Szabo L.L.P.

[57] ABSTRACT

A gas bag for a vehicle occupant restraint device has a vent opening covered by a stretched fabric member connected along the edge of the vent opening. The fabric member can be bulged in the manner of a cup under the influence of internal gas pressure, thereby reducing the cross-section of the vent opening in response to an increase of internal gas bag pressure.

4 Claims, 1 Drawing Sheet

IMPACT PROTECTION DEVICE FOR VEHICLE OCCUPANTS WITH AN INFLATABLE GAS BAG

The invention relates to an impact protection device for vehicle occupants with an inflatable gas bag and a gas generator for the sudden inflation of the gas bag on igniting of a propellant charge arranged in the gas generator.

Such impact protection devices have been known for many years under the abbreviated title "airbag" and almost all modern motor vehicles are equipped with them as standard practice. In the meantime, not only are the airbags offered which are accommodated in the steering wheel for the driver of the vehicle, but also passenger airbags, side airbags, head airbags etc. are offered as standard practice or at least as an option. The purpose of all these impact protection devices is to avoid injuries to the vehicle occupants as a result of excessive inertial forces.

For activation of the gas bag, a signal is triggered by means of suitable acceleration sensors, which brings about a prompt inflation of the gas bag in order to install a cushion in the shortest period of time between the occupants and the bodywork parts of the vehicle, into which cushion the vehicle occupant can plunge to be retained thereby. For this, the cushion or the gas pillow must be constructed so as to be flexible, i.e. it must in fact reach its full size promptly, but it must not remain hard or fully elastic and it must not throw the plunging body back. Rather, it must have a more plastic behaviour with regard to shock and must be compressible under the influence of the impinging mass.

For this, the gas filling must be able to escape from the airbag. This is frequently achieved in that the gas bag consists of a fabric which has a certain gas-permeability over the entire surface, which does not have a negative effect during the sudden inflation but which leads to an at least partial emptying of the gas bag when the body plunges into it, whereby the gas bag assumes the plastic behaviour with regard to shock which is aimed for.

The inflation and deflation behaviour of gas bags is tested with so-called "dummies" in impact tests. Here, dolls copied from the human body are arranged in a vehicle bodywork, have seatbelts put on them and are driven at a defined speed against a fixed obstacle. By means of a plurality of acceleration sensors, the sequence of movement of various body parts is determined here and is evaluated together with the speed- and acceleration parameters of the vehicle bodywork, in order to be able to indicate parameters for the design of the impact protection devices. Last but not least, the outflow behaviour of a gas bag is also established in this way.

In so doing, the problem arises that the mass of a body plunging into an airbag in an accident can vary within broad limits. The weight range of vehicle occupants is only roughly circumscribed at 50 and 100 kg. It should be clear that a big individual has to be "braked" differently by an airbag from a small, slim person. Accordingly, the impact tests are also carried out with dummies of different weight, for which, a percentage classification has been developed. One speaks of a 5% dummy when one wishes to simulate a small impact mass and of a 95% dummy when one wishes to simulate a large impact mass.

For the design of a gas bag, this produces the problem that one can not predict the weight of an individual falling into the inflated gas bag in an accident. As regards the design of the inflation volume, one must go to the upper limit; this approach is not practical with regard to the outlet behaviour, because the airbag would be too "hard" for a small person.

An object of the invention is to provide a gas bag which has an outlet behaviour adapted to a plunging body mass, so that all possible vehicle occupants can be protected in an optimum manner by an airbag of identical constitution.

According to the invention, the vent opening has a fabric layer stretched over it, which is fastened to the edge of the vent opening and can bulge in the manner of a cup under the influence of the gas flowing through and of the internal pressure in the gas bag, and in so doing causes a reduction of the outlet cross-section of the vent opening in response to the internal pressure generated by a vehicle occupant plunging into the gas bag.

A gas bag which is constructed in such a way has the advantage that it adjusts itself automatically to the plunging body mass with regard to the outlet behaviour, the cross-section of the vent opening being controlled so that the gas; can escape more quickly when a light body plunges in than when a heavy body plunges in. This advantage is achieved in a very simple manner because no separate regulating circuit with sensors to determine the body weight is necessary for controlling the cross-section because the components which are arranged according to the invention can readily bring about an effective automatic regulation of the cross-section.

Further details are explained in closer detail with reference to the example embodiments illustrated in FIGS. 1 and 3, in which.

Figure 1:
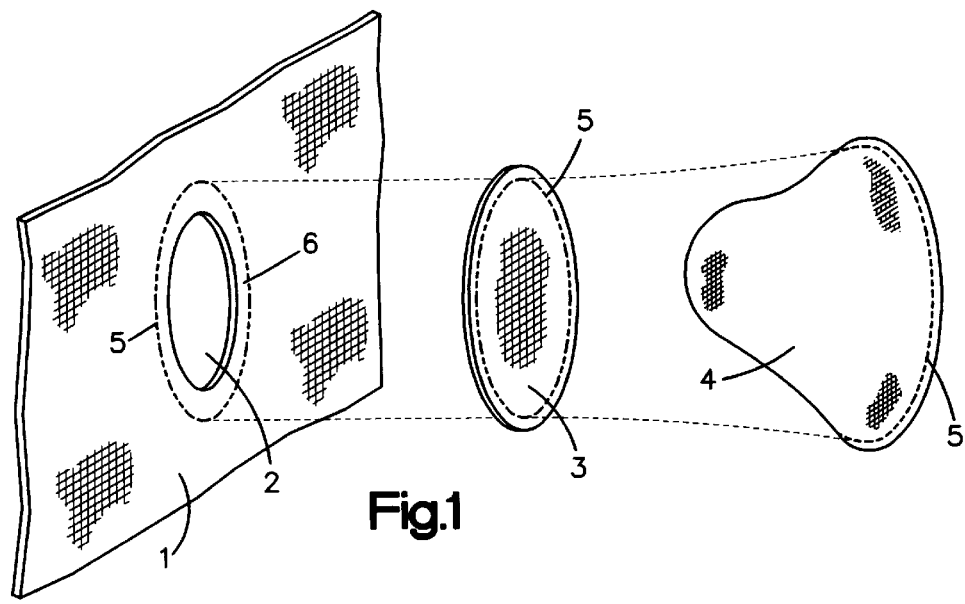
FIG. 1 shows a gas bag cut-out with the fabric layers according to the invention in an exploded view.

In the cut-out of a gas bag 1, illustrated in FIG. 1, a vent opening 2 is provided which has first fabric layer 4 stretched over it and a second fabric layer 3. The fabric layers 3 and 4 are connected along a peripheral line 5 adjacent the edge 6 of the vent opening 2. The fabric layer 3 consists of a non-elastic fabric which is relatively gas-permeable compared to fabric layer 4, whilst the fabric layer 4 is less gas-permeable than fabric layer 3 and either consists of an elastic material or is dimensioned such that a cup-like curvature can also form without elastic stretching of the material.

Under the influence of the outflowing gas and the internal pressure increase which is generated by a vehicle occupant plunging in, the two fabric layers act together such that the first fabric layer 4, owing to the greater gas flow resistance, as illustrated, curves in the manner of a cup or in the form of a bell and extends through the vent opening 2, the second fabric layer 3 being entrained. As this layer consists of non-elastic material, its curvature automatically leads to a reduction in length of the periphery of the vent opening 2 and hence to a reduction of its cross-section, because a curvature of the non-elastic material in the gas flow direction is only possible if at the same time the edge 6 of the vent opening 2 is shortened, which is equivalent to a reduction of the outlet cross-section.

It is obvious that the reduction of the outlet cross-section is self-regulating in the sense that when a heavy body plunges into the gas bag, the second fabric layer is curved much more intensively and hence the edge 6 of the vent opening 2 is contracted much more than when a light body plunges into the gas bag 1.

Figure 2:
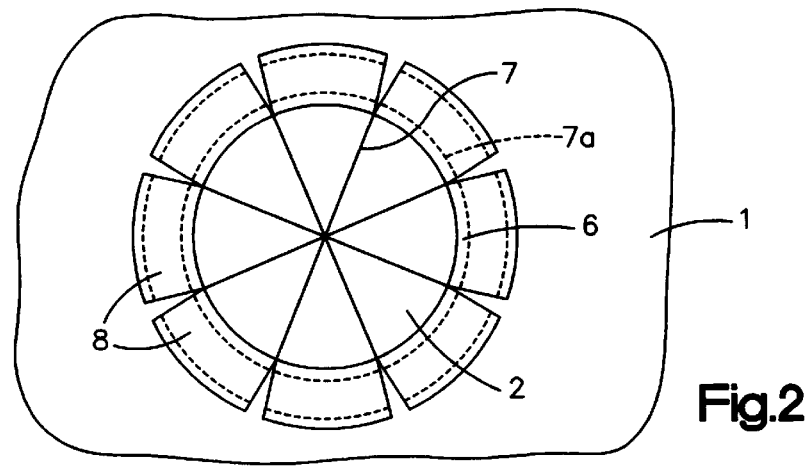
FIG. 2 shows a gas bag cut-out according to a second embodiment of the invention.

In the embodiment according to FIG. 2, the non-elastic fabric layer 3 is replaced by a non-elastic thread 7, which can consist either of separate strands the ends of which are attached to the edge 6 of the vent opening 2 or of an endless loop which is either fastened at regions 7a on the edge 6 of the vent opening 2 or—as illustrated in FIG. 2—is guided so as to be movable longitudinally in seam sections 8 of a folded-over border of the gas bag 1. Here, also, a curvature of the non-elastic threads in the gas flow direction causes the edge 6 of the vent opening to be shortened and hence the outlet cross-section is reduced. Also in this embodiment, the reduction of the cross-section is self-regulating in the sense explained above.

Figure 3:
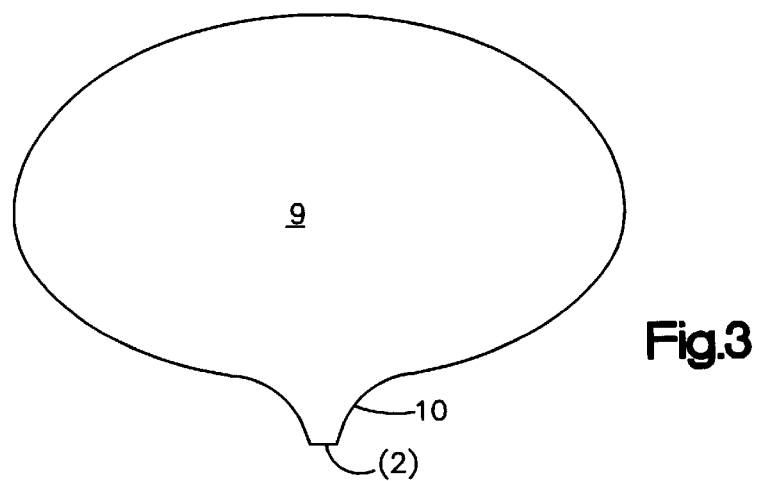
FIG. 3 shows an expediently developed fabric section.

FIG. 3 shows a fabric section 9 which is sewn for the production of a gas bag with a second, identically cut fabric section. In order to facilitate the contraction of the vent opening, a bottleneck-like shoulder 10 is provided on the fabric sections 9 which, when the gas bag is inflated, forms a region in which the fabric is exposed to considerably smaller tensions than in the remaining regions. This means that the resistance of the fabric which is stressed by the internal pressure with respect to a reduction of the outlet cross-section is much smaller and that one therefore manages with smaller "adjustment forces" for the adaptation of the outflow behaviour to the plunging body mass.

What is claimed is:

1. An impact protection device for a vehicle occupant comprising an inflatable gas bag, said gas bag having a vent opening, a gas-permeable fabric material stretched over said vent opening, said fabric material being fastened to said gas bag along the edge of said vent opening and bulging in the manner of a cup under the influence of gas flowing through said fabric material and of the internal pressure in said gas bag to cause a reduction of the cross-section of said vent opening in response to increasing internal pressure within said gas bag, said fabric material comprising a plurality off non-elastic threads stretched over said vent opening and connected at their ends with the edge of said vent opening.

2. An impact protection device for a vehicle occupant comprising an inflatable gas bag, said gas bag having a vent opening, a gas-permeable fabric material stretched over said vent opening, said fabric material being fastened to said gas bag along the edge of said vent opening and bulging in the manner of a cup under the influence of gas flowing through said fabric material and of the internal pressure in said gas bag to cause a reduction of the cross-section of said vent opening in response to increasing internal pressure within said gas bag, said fabric material comprising a fabric layer and a thread consisting of an endless loop stretched over said vent opening in a plurality of strands and fastened at the edge of said vent opening.

3. The device according to claim 2 wherein said thread is guided so as to be movable longitudinally within seam sections of folded-over gas bag material along the edge of said vent opening.

4. An impact protection device for a vehicle occupant comprising an inflatable gas bag, said gas bag having a vent opening, a gas-permeable fabric material stretched over said vent opening, said fabric material being fastened to said gas bag along the edge of said vent opening and bulging in the manner of a cup under the influence of gas flowing through said fabric material and of the internal pressure in said gas bag to cause a reduction of the cross-section of said vent opening in response to increasing internal pressure within said gas bag, said fabric material comprising a first fabric layer and a second fabric layer, said first fabric layer being elastic and less gas-permeable than said second fabric layer and said second fabric layer being non-elastic and relatively gas-permeable compared to said first fabric layer, said first and second fabric layers being stretched over said vent opening and being connected to said gas bag along the edge of said vent opening, said second layer being entrained by said first layer when said first layer is bulged outwardly in response to increasing internal pressure within said gas bag, said first fabric layer having a surface area in excess of the surface area of said vent opening so that a cup-shaped curvature of said first fabric layer forms extending through said vent opening when said gas bag is inflated and is stressed by a vehicle occupant plunging into said gas bag.

* * * * *